US006990261B2

(12) United States Patent
Kuramata

(10) Patent No.: US 6,990,261 B2
(45) Date of Patent: Jan. 24, 2006

(54) OPTICAL CIRCUIT DEVICE AND METHOD FOR FABRICATING THE SAME

(75) Inventor: Akito Kuramata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 10/295,885

(22) Filed: Nov. 18, 2002

(65) Prior Publication Data

US 2003/0113053 A1 Jun. 19, 2003

(30) Foreign Application Priority Data

Dec. 14, 2001 (JP) .............................. 2001-381169

(51) Int. Cl.
*G02B 6/12* (2006.01)
(52) U.S. Cl. .................................................. 385/14
(58) Field of Classification Search ................... 385/14, 385/131, 27, 130; 360/17; 257/631, 192, 257/80; 428/336, 692, 642; 427/131, 132; 156/281, 306.3; 235/336, 692, 642, 131, 235/132, 281, 306.3
See application file for complete search history.

(56) References Cited

U.S. PATENT DOCUMENTS

| | | | | |
|---|---|---|---|---|
| 4,077,817 A | * | 3/1978 | Bellavance | .................. 117/56 |
| 4,828,935 A | * | 5/1989 | Jonker et al. | ................. 428/642 |
| 4,833,020 A | * | 5/1989 | Shiroishi et al. | ............ 428/336 |
| 4,973,119 A | * | 11/1990 | Taki | ............................ 385/130 |
| 5,772,431 A | * | 6/1998 | Ikeya et al. | ............... 432/254.2 |
| 5,858,121 A | * | 1/1999 | Wada et al. | ................. 136/265 |
| 6,120,917 A | * | 9/2000 | Eda | ............................. 428/692 |
| 6,208,795 B1 | * | 3/2001 | Nakano et al. | ............. 385/131 |
| 6,353,317 B1 | * | 3/2002 | Green et al. | ................. 324/252 |
| 6,804,069 B2 | * | 10/2004 | Nishikawa et al. | ........... 360/17 |
| 2002/0145833 A1 | * | 10/2002 | Shiroishi | ..................... 360/317 |
| 2003/0113053 A1 | * | 6/2003 | Kuramata | ..................... 385/14 |

OTHER PUBLICATIONS

J.K. Furdyna, *Diluted magnetic semiconductors*, J. Appl. Phys. 64(4) Aug. 15, 1988, R29-64.
Linus Pauling, *The Nature of the Chemical Bond and the Structure of Molecules and Crystals: An Introduction to Modern Structural Chemistry*, Third Edition, Cornell University Press, 1960, p. 244-255.
J. K. Furdyna, Diluted magnetic semiconductors, J. Appl. Phys. 64(4), Aug. 15, 1988, R29-64.
Linus Pauling, Masao Koizumi, The Nature of the Chemical Bond, Revised Edition, Kyoritsu Shuppan Co., Ltd., p. 223-226, 1960.
Linus Pauling, The Nature of the Chemical Bond and the Structure of Molecules and Crystals: An Introduction to Modern Structural Chemistry, Third Edition, Cornell University Press, 1960, p244-255.

(Continued)

*Primary Examiner*—Thien M. Le
(74) *Attorney, Agent, or Firm*—Armstrong, Kratz, Quintos, Hanson & Brooks, LLP

(57) ABSTRACT

An optical circuit device including a substrate of a III–V group compound semiconductor, and a magnetic semiconductor layer having a chalcopyrite type crystal structure. The magnetic semiconductor having the chalcopyrite type crystal structure is a material which can provide Faraday effect, and the use of such material makes it possible to form the Faraday rotation element. Furthermore, the magnetic semiconductor having the chalcopyrite type crystal structure which can lattice-match with the substrates have little crystal defects, which can make a light loss of the Faraday rotation element small. The magnetic semiconductor of the chalcopyrite type crystal structure can provide large Verdet's constant, which makes it possible to reduce a length of the Faraday rotation element and resultantly makes it possible to micronize the optical circuit device.

17 Claims, 11 Drawing Sheets

OTHER PUBLICATIONS

"Direct Bonding Between Quaternary Compound Semiconductor and Garnet Crystals for Integrated Optical Isolator", H. Yokoi, et al.; Japanese Journal of Applied Physics, vol. 38, Part 1, No. 1A, Jan., 1999; pp. 195-197.

"Room Temperature Ferromagnetism In Novel Diluted Magnetic Semiconductor $Cd_{1-x}Mn_xGeP_2$"; G.A. Medvedkin, et al.; Japanese Journal of Applied Physics, vol. 39, Part 2, No. 10A, Oct. 1, 2000, pp. 949-951.

"Second-Harmonic Generation From Chalcopyrite-Structure Semiconductor Thin Films", D.J. Bottomley, et al.; Optics Letters; Optical Society of America, Washington, U.S.; vol. 21, No. 4, Feb. 15, 1996; pp. 254-256.

* cited by examiner

AVARAGE ANION-CATION BOND DISTANCE (angstrom)

OPTICAL CIRCUIT DEVICE AND METHOD FOR FABRICATING THE SAME

CROSS-REFERENCE TO RELATED APPLICATION

This application is based upon and claims priority of Japanese Patent Application No. 2001-381169, filed on Dec. 14, 2001, the contents being incorporated herein by reference.

BACKGROUND OF THE INVENTION

1. Field of the Invention

The present invention relates to an optical circuit device and a method for fabricating the optical circuit device, more specifically to an optical circuit device including a Faraday rotation element, and a method for fabricating the same.

2. Description of the Related Art

An optical isolator propagates light in one direction (forward direction) substantially without attenuation and does not propagate the light in the opposite direction (backward direction) and is a non-reciprocity optical device which propagates light in one direction alone.

A beam exiting a semiconductor laser is reflected outside the semiconductor laser to enter again the semiconductor laser, which makes the operation of the semiconductor laser unstable, resulting in noise increase. For removing such reflected beam, the optical isolator is disposed on the output side of a semiconductor laser.

A conventional optical isolator will be explained with reference to FIG. 10. FIG. 10 is a conceptual view of the conventional optical isolator.

As shown in FIG. 10, the optical isolator comprises a Faraday rotation element 122, polarizers 119a, 119b disposed, sandwiching the Faraday rotation element 122, and permanent magnets 120a, 120b.

In the optical communication, light of long wavelength regions, as of a 1.3 μm-band and a 1.55 μm-band is used. As the Faraday rotation element 122 for such long-wavelength region, bulk yttrium iron garnet (YIG) is generally used.

Of forward light incident on the polarizer 119a only a component on the polarization plane of the polarizer 119a passes through the polarizer 119a to be introduced into the Faraday rotation element 122. Forward light introduced into the Faraday rotation element 122 exits through the polarizer 119b because the polarization plane is rotated by 45 degrees due to the Faraday effect.

On the other hand, of backward light, which is reflected light, a component on the polarization plane of the polarizer 119a passes through the polarizer 119a to be introduced into the Faraday rotation element 122. The backward light introduced into the Faraday rotation element 122 does not exit the polarizer because the polarization plane is rotated by 45 degrees in a direction opposite to a direction for the forward light, and the polarization plane of the polarizer is offset by 90 degrees.

Thus, the optical isolator can transmit light in only one direction.

As an optical element using the Faraday rotation element, an optical circulator is proposed.

In the optical circulator incident light and exit light circulate, and the optical circulator is a non-reciprocity optical device having the function of isolating the incident light and the exit light from each other.

A conventional optical circulator will be explained with reference to FIGS. 11A and 11B. FIGS. 11A and 11B are conceptual views of the conventional optical circulator. FIG. 11A is a conceptual view of a structure of the conventional optical circulator. FIG. 11B is a conceptual view of an operation of the optical circulator shown in FIG. 11A.

As shown in FIG. 11A, the optical circulator comprises a Faraday rotation element 122, a half-wave plate 123, polarization beam slitters 125a, 125b, and mirrors 127a, 127b.

In such optical circulator, as shown in FIG. 11B, light incident on a port 1 exits only at a port 2, light incident on the port 2 exits only at a port 3, light incident on the port 3 exits only at a port 4, and light incident on the port 4 exits only at the port 1.

On the other hand, recently optical circuit devices comprising optical elements, such as a semiconductor laser, semiconductor receiving optics, an optical modulator, a semiconductor light amplifier, an optical multiplexer, an optical branching filter, etc., formed on one and the same substrate is proposed. All of such optical elements can be formed of compound semiconductors, and can be integrated on one and the same compound semiconductor substrate. In integrating semiconductor lasers of a 1.3 μm-band and a 1.55 μm-band used in optical communication, III–V group compound semiconductor substrates, such as InP substrates, InGaAs substrates, GaAs substrates, etc., are used.

However, yttrium iron garnet the above-described Faraday rotation element 122 is formed of is a material which is very difficult to be used on III–V group compound semiconductor substrates, such as InP substrates, etc. In a case where the Faraday rotation element 122 is formed of yttrium iron garnet, the Faraday rotation element 122 and a semiconductor laser, etc. cannot be integrated on one and the same compound semiconductor substrate.

Recently, as materials of the Faraday rotation element, the use of II–VI group magnetic semiconductor and III–V group magnetic semiconductor containing MnAs are proposed.

However, the Faraday rotation element of the proposed II–VI group magnetic semiconductor is usable only for the light of a short wavelength region and is not usable for the light of a long-wavelength region as of a 1.3 μm-band and a 1.55 μm-band. In a case where II–VI group magnetic semiconductor is grown on a III–V group compound semiconductor substrate, the II–VI group magnetic semiconductor cannot grown to have good crystallinity, with a result of large light loss. Accordingly, when a material of the Faraday rotation element is II–VI group magnetic semiconductor, it is difficult to provide an optical circuit device comprising the Faraday rotation element and a semiconductor laser integrated on one and the same III–V group compound semiconductor substrate.

The III–V group magnetic semiconductor containing MsAs has large photoabsorption, has low Curie temperature, and does not have good crystallinity. When a material of the Faraday rotation element is MnAs content-III–V group magnetic semiconductor, it is difficult to provide an optical circuit device comprising the Faraday rotation element and a semiconductor laser integrated on one and the same III–V group compound semiconductor substrate.

SUMMARY OF THE INVENTION

An object of the present invention is to provide an optical circuit device which permits a Faraday rotation element, a semiconductor laser, etc. integrated on one and the same compound semiconductor, and a method for fabricating the optical circuit device.

According to one aspect of the present invention, there is provided an optical circuit device comprising; a substrate of a III–V group compound semiconductor; and a magnetic semiconductor layer formed on the substrate, substantially lattice matching with the substrate and having the chalcopyrite type crystal structure.

According to another aspect of the present invention, there is provided a method for fabricating an optical circuit device comprising the step of forming on the substrate of a III–V group compound semiconductor a magnetic semiconductor layer which substantially lattice matches with the substrate and has a chalcopyrite type crystal structure.

As described above, according to the present invention, the Faraday rotation element which is good, can have small light loss and can be micronized can be formed on a III–V group semiconductor substrate. Furthermore, according to the present invention, the waveguide layer forming the Faraday rotation element is formed in a mesa, which permits the optical circuit device to have good coupling efficiency.

According to the present invention Faraday rotation element is formed on a III–V group semiconductor substrate, which is widely used as substrates of semiconductor lasers, etc., which allows the optical circuit device to have a semiconductor laser, an optical isolator, etc. integrated on one and the same III–V group semiconductor substrate.

DETAILED DESCRIPTION OF THE PREFERRED EMBODIMENTS

Figure 1:
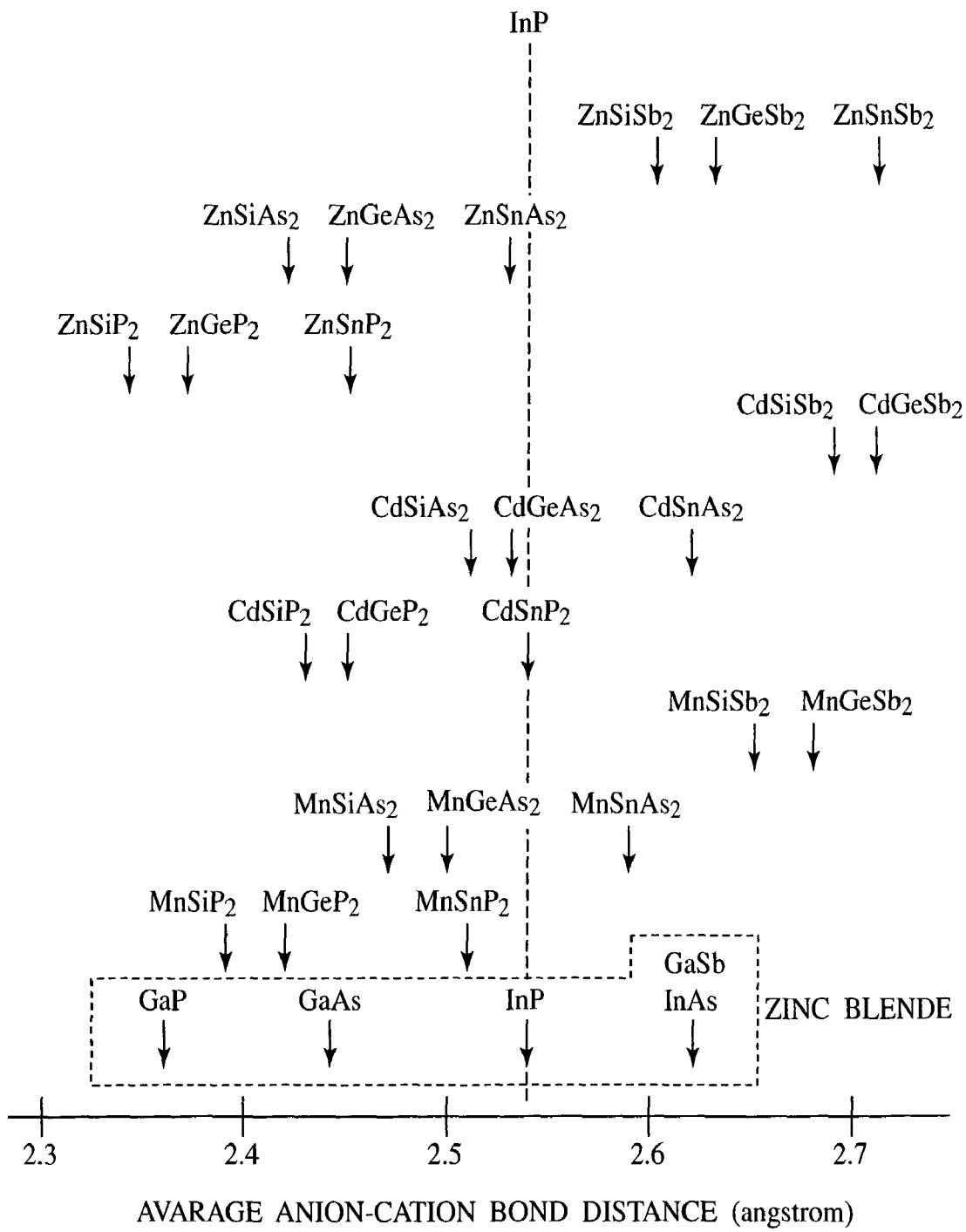
FIG. 1 is a view of average anion-cation bond distances of respective compounds (Part 1).

First, the principle of the present invention will be explained.

As described above, a technology forming good Faraday rotation elements on III–V group compound semiconductor substrates, such as InP substrates, $In_xGa_{1-x}As$ substrates, GaAS substrates, etc. have not yet been proposed.

The inventor of the present invention has made earnest studies and had an idea of using as a material of the Faraday rotation element, a magnetic semiconductor of the chalcopyrite type crystal structure which can lattice-match with III–V group compound semiconductor substrates.

The magnetic semiconductor having the chalcopyrite type crystal structure is a material which can provide Faraday effect, and the use of such material makes it possible to form the Faraday rotation element. Furthermore, the magnetic semiconductor having the chalcopyrite type crystal structure which can lattice-match with the substrates have little crystal defects, which can make a light loss of the Faraday rotation element small. The magnetic semiconductor of the chalcopyrite type crystal structure can provide large Verdet's constant, which makes it possible to reduce a length of the Faraday rotation element and resultantly makes it possible to micronize the optical circuit device.

However, no magnetic semiconductor of the chalcopyrite type crystal structure which can lattice-match with III–V group compound semiconductor substrates have been so far reported.

The inventor of the present invention has searched after in the following way a magnetic semiconductor of the chalcopyrite type crystal structure which can lattice-match with III–V group compound semiconductor substrates.

(For InP Substrate)

The magnetic semiconductor of the chalcopyrite type crystal structure which can lattice-match with the InP substrate will be explained.

An example in which Mn is used as a transition metal element will be explained here.

The lattice constant of the magnetic semiconductor of the chalcopyrite type crystal structure which contains Mn has not so far reported.

J. K. Furdyna, JAP 64 (1988) R29 (hereinafter called Reference 1) describes data of anion-cation bond distances of Mn-content II–VI group compound semiconductor mixed crystals. When an anion-cation bond distance of Mn—S bonds is given based on the data of Reference 1, the distance is 3.97 angstrom. An anion-cation bond distance of Mn—Se bonds is given, the distance is 4.17 angstrom. When an anion-cation bond distance of Mn—Te bonds is given, the distance is 4.51 angstrom.

On the other hand, Linus Pauling, THE NATURE OF THE CHEMICAL BOND, Cornell University Press, New York, 1960 (hereinafter called Reference 2) describes tetrahedral covalent radius of S, Se, Te. According to Reference 2, a tetrahedral covalent radius of the S is 1.04 angstrom, and a tetrahedral covalent radius of the Te is 1.32 angstrom. When a tetrahedral covalent radius of the Mn is given based on these values, the tetrahedral covalent radius is 1.42 angstrom.

Reference 2 describes tetrahedral covalent radius of Zn, Cd, In, Ga, Si, Ge, Sn, P, As, Sb, etc.

When, based on these values, average bond distances of anion-cation bonds of the crystals of the $Zn-IV-V_2$ type compounds, the $Cd-IV-V_2$ type compounds and $Mn-IV-V_2$ type compounds, of the chalcopyrite type crystal structure are given, the average bond distances are as shown in FIG. 1.

FIG. 1 is a view of the average bond distances of the anion-cation bond distances of the respective compound crystals. A horizontal axis in FIG. 1 is the average bond distances of the anion-cation bond distances. In FIG. 1, the view means nothing in the vertical direction, and the broken line indicates the anion-cation bond distance of InP crystals.

FIG. 1 shows not only the average anion-cation bond distance of the crystals of compounds of the chalcopyrite type crystal structure (hereinafter called chalcopyrite type compounds), but also the average anion-cation bond distance of compounds of zinc blende type crystal structure (hereinafter called zinc blende type compounds) In FIG. 1, the zinc blende type compounds are enclosed with the dot line.

A quaternary compound of the chalcopyrite type crystal structure which contains Mn as a transition metal element and can lattice-match with the InP substrate is given as follows by using FIG. 1.

Firstly, the quaternary compound of the chalcopyrite type crystal structure can be prepared by combining ternary compounds (hereinafter also called chalcopyrite type ternary compounds) which have a symmetrical positional relationship with respect to the broken line in FIG. 1, at least one of which contains Mn, which have two common elements and which have the chalcopyrite type crystal structure. The crystals of compounds given by combining the compounds symmetrically positioned with respect to the broken line in FIG. 1 have anion-cation bond distances indicated by the broken line in FIG. 1. The position indicated by the broken line in FIG. 1 is the average anion-cation bond distance of InP. The average anion-cation bond distances of the crystals of the compounds prepared by such combination are substantially equal to the average anion-cation bond distance of InP crystals. Accordingly, the crystals of the compounds prepared by such combination lattice-match with InP. Because of at least one of the chalcopyrite type ternary compounds used in the combination contains Mn, a quaternary compound of the chalcopyrite type crystal structure (hereinafter also called a chalcopyrite type quaternary compound) given by such combination contains Mn as a transition metal element. Because the chalcopyrite type ternary compounds used in the combination are common in two elements, a compound prepared by the combination is a quaternary compound.

Secondly, the quaternary compound of the chalcopyrite type crystal structure can be prepared by combining compounds which have symmestrical positional relationship with respect to the broken line in FIG. 1, one of which is the chalcopyrite type compound containing Mn, the other of which is a zinc blende type compound containing a V group element which is in common with the chalcopyrite type compound. Even the combination of such compounds can prepare a chalcopyrite type quaternary compound which contains Mn as a transition metal element and can lattice match with InP substrates.

The chalcopyrite type quaternary compounds thus prepared are largely divided in $(T_{0.5}IV_{0.5})_X III_{1-X}V$ type, $T_{0.5}(IV_X IV'_{1-X})_{0.5}V$ type, $T_{0.5}IV_{0.5}V_X V'_{1-X}$ type and $(II_X T_{1-X})_{0.5}IV_{0.5}V$ type. T represents a transition metal element; II indicates a II group element; III denotes a III group element; IV and IV' represent a IV group element; V and V' indicate a V group element. $II_{0.5}IV_{0.5}V$ type and II–IV–$V_2$ type are synonymous.

As chalcopyrite type quaternary compounds of $(T_{0.5}IV_{0.5})_X III_{1-X}V$ type are considered $(Mn_{0.5}Si_{0.5})_X In_{1-X}As$, $(Mn_{0.5}Ge_{0.5})_X In_{1-X}As$ and $(Mn_{0.5}Sn_{0.5})_X Ga_{1-X}As$.

A composition ratio X of $(Mn_{0.5}Si_{0.5})_X In_{1-X}As$ for the lattice-matching with InP is 0.54 in computation. The composition ratio X is suitably set in the range of 0.44 to 0.64, whereby $(Mn_{0.5}Si_{0.5})_X In_{1-X}As$ which substantially lattice-matches with InP can be prepared.

A composition ratio X of $(Mn_{0.5}Ge_{0.5})_X In_{1-X}As$ for the lattice-matching with InP is 0.66 in computation. The composition ratio X is suitably set in the range of 0.56 to 0.76, whereby $(Mn_{0.5}Ge_{0.5})_X In_{1-X}As$ which substantially lattice-matches with InP can be prepared.

A composition ratio X of $(Mn_{0.5}Sn_{0.5})_X Ga_{1-X}As$ for the lattice-matching with InP is 0.67 in computation. The composition ratio X is suitably set in the range of 0.57 to 0.77, whereby $(Mn_{0.5}Sn_{0.5})_X Ga_{1-X}As$ which substantially lattice-matches with InP can be prepared.

As chalcopyrite type quaternary compounds of $T_{0.5}(IV_X IV'_{1-X})_{0.5}V$ type are considered $(Mn_{0.5}(Si_X Sn_{1-X})_{0.5})As$ and $(Mn_{0.5}(Ge_X Sn_{1-X})_{0.5})As$.

A composition ratio X of $(Mn_{0.5}(Si_X Sn_{1-X})_{0.5})As$ for the lattice-matching with InP is 0.42 in computation. The composition ratio X is suitably set in the range of 0.32 to 0.52, whereby $(Mn_{0.5}(Si_X Sn_{1-X})_{0.5})As$ which substantially lattice-matches with InP can be prepared.

A composition ratio X of $(Mn_{0.5}(Ge_X Sn_{1-X})_{0.5})As$ for the lattice-matching with InP is 0.54 in computation. The composition ratio X is suitably set in the range of 0.44 to 0.64, whereby $(Mn_{0.5}(Ge_X Sn_{1-X})_{0.5})As$ which substantially lattice-matches with InP can be prepared.

As chalcopyrite type quaternary compounds of $T_{0.5}IV_{0.5}V_X V'_{1-X}$ type are considered $Mn_{0.5}Si_{0.5}P_X Sb_{1-X}$, $Mn_{0.5}Si_{0.5}As_X Sb_{1-X}$, $Mn_{0.5}Ge_{0.5}P_X Sb_{1-X}$, $Mn_{0.5}Ge_{0.5}As_X Sb_{1-X}$, $Mn_{0.5}Sn_{0.5}P_X As_{1-X}$ and $Mn_{0.5}Sn_{0.5}P_X Sb_{1-X}$.

A composition ratio X of $Mn_{0.5}Si_{0.5}P_X Sb_{1-X}$ for the lattice-matching with InP is 0.44 in computation. The composition ratio X is suitably set in the range of 0.34 to 0.54, whereby $Sn_{0.5}Si_{0.5}P_X Sb_{1-X}$ which substantially lattice-matches with InP can be prepared.

A composition ratio X of $Mn_{0.5}Si_{0.5}As_X Sb_{1-X}$ for the lattice-matching with InP is 0.63 in computation. The composition ratio X is suitably set in the range of 0.53 to 0.73, whereby $Mn_{0.5}Si_{0.5}As_X Sb_{1-X}$ which substantially lattice-matches with InP can be prepared.

A composition ratio X of $Mn_{0.5}Ge_{0.5}P_X Sb_{1-X}$ for the lattice-matching with InP is 0.53 in computation. The composition ratio X is suitably set in the range of 0.43 to 0.63, whereby $Mn_{0.5}Ge_{0.5}P_X Sb_{1-X}$ which substantially lattice-matches with InP can be prepared.

A composition ratio X of $Mn_{0.5}Ge_{0.5}As_X Sb_{1-X}$ for the lattice-matching with InP is 0.77 in computation. The composition ratio X is suitably set in the range of 0.67 to 0.87, whereby $Mn_{0.5}Ge_{0.5}As_X Sb_{1-X}$ which substantially lattice-matches with InP can be prepared.

A composition ratio X of $Mn_{0.5}Sn_{0.5}P_X As_{1-X}$ for the lattice-matching with InP is 0.60 in computation. The composition ratio X is suitably set in the range of 0.50 to 0.70, whereby $Mn_{0.5}Sn_{0.5}P_X As_{1-X}$ which substantially lattice-matches with InP can be prepared.

A composition ratio X of $Mn_{0.5}Sn_{0.5}P_X Sb_{1-X}$ for the lattice-matching with InP is 0.88 in computation. The composition ratio X is suitably set in the range of 0.78 to 0.98, whereby $Mn_{0.5}Sn_{0.5}P_X Sb_{1-X}$ which substantially lattice-matches with InP can be prepared.

As chalcopyrite type quaternary compounds of $(II_X T_{1-X})_{0.5}IV_{0.5}V$ type are considered $(Zn_X Mn_{1-X})_{0.5}Sn_{0.5}As$.

A composition ratio X of $(Zn_X Mn_{1-X})_{0.5}Sn_{0.5}As$ for the lattice-matching with InP is 0.91 in computation. The composition ratio X is suitably set in the range of 0.81 to 1, whereby $(Zn_X Mn_{1-X})_{0.5}Sn_{0.5}As$ which substantially lattice-matches with InP can be prepared.

Magnetic semiconductors composed of the chalcopyrite type quaternary compounds which can lattice match with InP have been here described. However, chalcopyrite type compounds which can lattice match with InP are not essentially to quaternary compounds but may be five or more elements chalcopyrite type compounds which can be prepared by mixing the above-described quaternary chalcopyrite type compounds by arbitrary ratios. The chalcopyrite type quaternary compounds prepared by the above-described combinations substantially lattice match with InP, and the five or more elements chalcopyrite type compounds prepared by combining the chalcopyrite type quaternary compounds prepared by the above-described combinations can lattice match with InP.

(With InGaAs Substrates)

Magnetic semiconductors of the chalcopyrite type crystal structure which can lattice match with InGaAs substrates will be explained.

Here, the InGaAs substrates will be exemplified by the $In_{0.3}Ga_{0.7}As$ substrate. A transition metal element will be exemplified by Mn, as described above.

Figure 2:
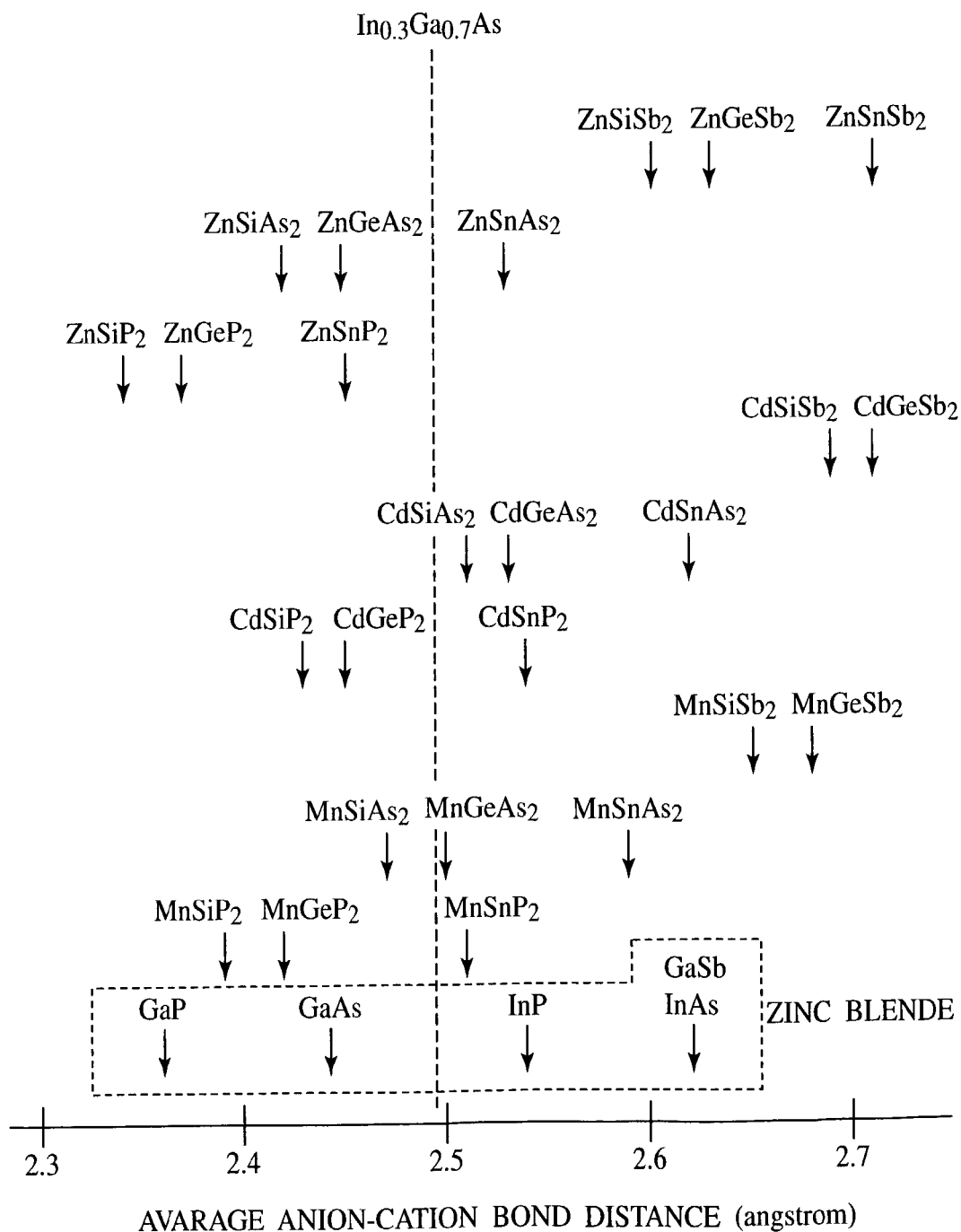
FIG. 2 is a view of average anion-cation bond distances of respective compounds (Part 2).

FIG. 2 is a view of average anion-cation bond distances of the crystals of respective compounds. In FIG. 2, the broken line indicates the average anion-cation bond distance of the crystals of $In_{0.3}Ga_{0.7}As$. FIG. 2 is the same as FIG. 1 except that the broken line indicates the average anion-cation bond distance of the crystal of $In_{0.3}Ga_{0.7}As$.

Chalcopyrite quaternary compounds which contain Mn as a transition metal element and can lattice match with $In_{0.3}Ga_{0.7}As$ can be given by using FIG. 2 in the same way as described above.

The chalcopyrite type quaternary compounds prepared by such combination are largely divided in $(T_{0.5}IV_{0.5})_xIII_{1-x}V$ type, $T_{0.5}(IV_xIV'_{1-x})_{0.5}V$ type, $T_{0.5}IV_{0.5}V_xV'_{1-x}$ type and $(II_xT_{1-x})_{0.5}IV_{0.5}V$ type.

As chalcopyrite type quaternary compounds of $(T_{0.5}IV_{0.5})_x III_{1-x}V$ type are considered $(Mn_{0.5}Si_{0.5})_xIn_{1-x}P$, $(Mn_{0.5}Ge_{0.5})_xIn_{1-x}P$, $(Mn_{0.5}Sn_{0.5})_xGa_{1-x}P$, $(Mn_{0.5}Si_{0.5})_x In_{1-x}As$, $(Mn_{0.5}Ge_{0.5})_xGa_{1-x}As$, $(Mn_{0.5}Sn_{0.5})_x Ga_{1-x}As$.

A composition ratio X of $(Mn_{0.5}Si_{0.5})_xIn_{1-x}P$ for the lattice matching with $In_{0.3}Ga_{0.7}As$ is 0.31 in computation. The composition ratio X is suitably adjusted in the range of 0.21 to 0.41, whereby $(Mn_{0.5}Si_{0.5})_xIn_{1-x}P$ which substantially lattice matches with $In_{0.3}Ga_{0.7}As$ can be prepared.

A composition ratio X of $(Mn_{0.5}Ge_{0.5})_xIn_{1-x}P$ for the lattice matching with $In_{0.3}Ga_{0.7}As$ is 0.38 in computation. The composition ratio X is suitably adjusted in the range of 0.28 to 0.48, whereby $(Mn_{0.5}Ge_{0.5})_xIn_{1-x}P$ which substantially lattice matches with $In_{0.3}Ga_{0.7}As$ can be prepared.

A composition ratio X of $(Mn_{0.5}Sn_{0.5})_xGa_{1-x}P$ for the lattice matching with $In_{0.3}Ga_{0.7}As$ is 0.90 in computation. The composition ratio X is suitably adjusted in the range of 0.80 to 1, whereby $(Mn_{0.5}Sn_{0.5})_xGa_{1-x}P$ which substantially lattice matches with $In_{0.3}Ga_{0.7}As$ can be prepared.

A composition ratio X of $(Mn_{0.5}Si_{0.5})_xIn_{1-x}As$ for the lattice matching with $In_{0.3}Ga_{0.7}As$ is 0.86 in computation. The composition ratio X is suitably adjusted in the range of 0.76 to 0.96, whereby $(Mn_{0.5}Si_{0.5})_xIn_{1-x}As$ which substantially lattice matches with $In_{0.3}Ga_{0.7}As$ can be prepared.

A composition ratio X of $(Mn_{0.5}Ge_{0.5})_xGa_{1-x}As$ for the lattice matching with $In_{0.3}Ga_{0.7}As$ is 0.92 in computation. The composition ratio X is suitably adjusted in the range of 0.82 to 1, whereby $(Mn_{0.5}Ge_{0.5})_xGa_{1-x}As$ which substantially lattice matches with $In_{0.3}Ga_{0.7}As$ can be prepared.

A composition ratio X of $(Mn_{0.5}Sn_{0.5})_xGa_{1-x}As$ for the lattice matching with $In_{0.3}Ga_{0.7}As$ is 0.36 in computation. The composition ratio X is suitably adjusted in the range of 0.26 to 0.46, whereby $(Mn_{0.5}Sn_{0.5})_xGa_{1-x}As$ which substantially lattice matches with $In_{0.3}Ga_{0.7}As$ can be prepared.

As chalcopyrite type quaternary compounds of $T_{0.5}(IV_xIV'_{1-x})_{0.5}V$ type are considered $(Mn_{0.5}(Si_xSn_{1-x})_{0.5})P$, $(Mn_{0.5}(Ge_xSn_{1-x})_{0.5})P$, $(Mn_{0.5}(Si_xGe_{1-x})_{0.5})As$, and $(Mn_{0.5}(Si_xSn_{1-x})_{0.5})As$.

A composition ratio X of $(Mn_{0.5}(Si_xSn_{1-x})_{0.5})P$ for the lattice matching with $In_{0.3}Ga_{0.7}As$ is 0.12 in computation. The composition ratio X is suitably adjusted in the range of 0.02 to 0.22, whereby $(Mn_{0.5}(Si_xSn_{1-x})_{0.5})P$ which substantially lattice matches with $In_{0.3}Ga_{0.7}As$ can be prepared.

A composition ratio X of $(Mn_{0.5}(Ge_xSn_{1-x})_{0.5})P$ for the lattice matching with $In_{0.3}Ga_{0.7}As$ is 0.16 in computation. The composition ratio X is suitably adjusted in the range of 0.06 to 0.26, whereby $(Mn_{0.5}(Ge_xSn_{1-x})_{0.5})P$ which substantially lattice matches with $In_{0.3}Ga_{0.7}As$ can be prepared.

A composition ratio X of $(Mn_{0.5}(Si_xGe_{1-x})_{0.5})As$ for the lattice matching with $In_{0.3}Ga_{0.7}As$ is 0.17 in computation. The composition ratio X is suitably adjusted in the range of 0.07 to 0.27, whereby $(Mn_{0.5}(Si_xGe_{1-x})_{0.5})As$ which substantially lattice matches with $In_{0.3}Ga_{0.7}As$ can be prepared.

A composition ratio X of $(Mn_{0.5}(Si_xSn_{1-x})_{0.5})As$ for the lattice matching with $In_{0.3}Ga_{0.7}As$ is 0.82 in computation. The composition ratio X is suitably adjusted in the range of 0.72 to 0.92, whereby $(Mn_{0.5}(Si_xSn_{1-x})_{0.5})As$ which substantially lattice matches with $In_{0.3}Ga_{0.7}As$ can be prepared.

As chalcopyrite type quaternary compounds of $T_{0.5}IV_{0.5}V_xV'_{1-x}$ type are considered $Mn_{0.5}Si_{0.5}P_xSb_{1-x}$, $Mn_{0.5}Si_{0.5}As_xSb_{1-x}$, $Mn_{0.5}Ge_{0.5}P_xAs_{1-x}$, and $Mn_{0.5}Ge_{0.5}P_xSb_{1-x}$.

A composition ratio X of $Mn_{0.5}Si_{0.5}P_xSb_{1-x}$ for the lattice matching with $In_{0.3}Ga_{0.7}As$ is 0.61 in computation. The composition ratio X is suitably adjusted in the range of 0.51 to 0.71, whereby $Mn_{0.5}Si_{0.5}P_xSb_{1-x}$ which substantially lattice matches with $In_{0.3}Ga_{0.7}As$ can be prepared.

A composition ratio X of $Mn_{0.5}Si_{0.5}As_xSb_{1-x}$ for the lattice matching with $In_{0.3}Ga_{0.7}As$ is 0.88 in computation. The composition ratio X is suitably adjusted in the range of 0.78 to 0.98, whereby $Mn_{0.5}Si_{0.5}As_xSb_{1-x}$ which substantially lattice matches with $In_{0.3}Ga_{0.7}As$ can be prepared.

A composition ratio X of $Mn_{0.5}Ge_{0.5}P_xAs_{1-x}$ for the lattice matching with $In_{0.3}Ga_{0.7}As$ is 0.05 in computation. The composition ratio X is suitably adjusted in the range of 0 to 0.15, whereby $Mn_{0.5}Ge_{0.5}P_xAs_{1-x}$ which substantially lattice matches with $In_{0.3}Ga_{0.7}As$ can be prepared.

A composition ratio X of $Mn_{0.5}Ge_{0.5}P_xSb_{1-x}$ for the lattice matching with $In_{0.3}Ga_{0.7}As$ is 0.71 in computation. The composition ratio X is suitably adjusted in the range of 0.61 to 0.81, whereby $Mn_{0.5}Ge_{0.5}P_xSb_{1-x}$ which substantially lattice matches with $In_{0.3}Ga_{0.7}As$ can be prepared.

As chalcopyrite type quaternary compounds of $(II_xT_{1-x})_{0.5}IV_{0.5}V$ type are considered $(Zn_xMn_{1-x})_{0.5}Sn_{0.5}P$, $(Zn_xMn_{1-x})_{0.5}Ge_{0.5}As$, and $(Cd_xMn_{1-x})_{0.5}Si_{0.5}As$.

A composition ratio X of $(Zn_xMn_{1-x})_{0.5}Sn_{0.5}P$ for the lattice matching with $In_{0.3}Ga_{0.7}As$ is 0.27 in computation. The composition ratio X is suitably adjusted in the range of 0.17 to 0.37, whereby $(Zn_xMn_{1-x})_{0.5}Sn_{0.5}P$ which substantially lattice matches with $In_{0.3}Ga_{0.7}As$ can be prepared.

A composition ratio X of $(Zn_xMn_{1-x})_{0.5}Ge_{0.5}As$ for the lattice matching with $In_{0.3}Ga_{0.7}As$ is 0.08 in computation. The composition ratio X is suitably adjusted in the range of 0 to 0.18, whereby $(Zn_xMn_{1-x})_{0.5}Ge_{0.5}As$ which substantially lattice matches with $In_{0.3}Ga_{0.7}As$ can be prepared.

A composition ratio X of $(Cd_xMn_{1-x})_{0.5}Si_{0.5}As$ for the lattice matching with $In_{0.3}Ga_{0.7}As$ is 0.65 in computation. The composition ratio X is suitably adjusted in the range of 0.55 to 0.75, whereby $(Cd_xMn_{1-x})_{0.5}Si_{0.5}As$ which substantially lattice matches with $In_{0.3}Ga_{0.7}As$ can be prepared.

$In_{0.3}Ga_{0.7}As$ substrates, i.e., $In_xGa_{1-x}As$ substrates having a composition ratio of 0.3, have been exemplified here. However, the composition ratio X of the $In_xGa_{1-x}As$ substrates is not essentially limited to 0.3 and may be suitably set in the range of, e.g., 0.2 to 0.4. Even when the composition ratio is suitably set in the range of 0.2 to 0,4, the above-described chalcopyrite type quaternary compounds can substantially lattice match with the InGaAs substrates.

Magnetic semiconductors composed of the chalcopyrite type quaternary compounds which can lattice match with InGaAs have been here described. However, chalcopyrite type compounds which can lattice match with InGaAs are not essentially to quaternary compounds but may be five or more elements chalcopyrite type compounds which can be prepared by mixing the above-described chalcopyrite type quaternary compounds by arbitrary ratios. The chalcopyrite type quaternary compounds prepared by the above-described combinations substantially lattice match with InGaAs, and the five or more elements chalcopyrite type compounds prepared by combining the chalcopyrite type quaternary compounds prepared by the above-described combinations can lattice match with InGaAs.

(With GaAs Substrates)

Magnetic semiconductors of the chalcopyrite type crystal structure which can lattice match with GaAs substrates will be explained.

A transition metal element will be exemplified by Mn, as described above.

Figure 3:
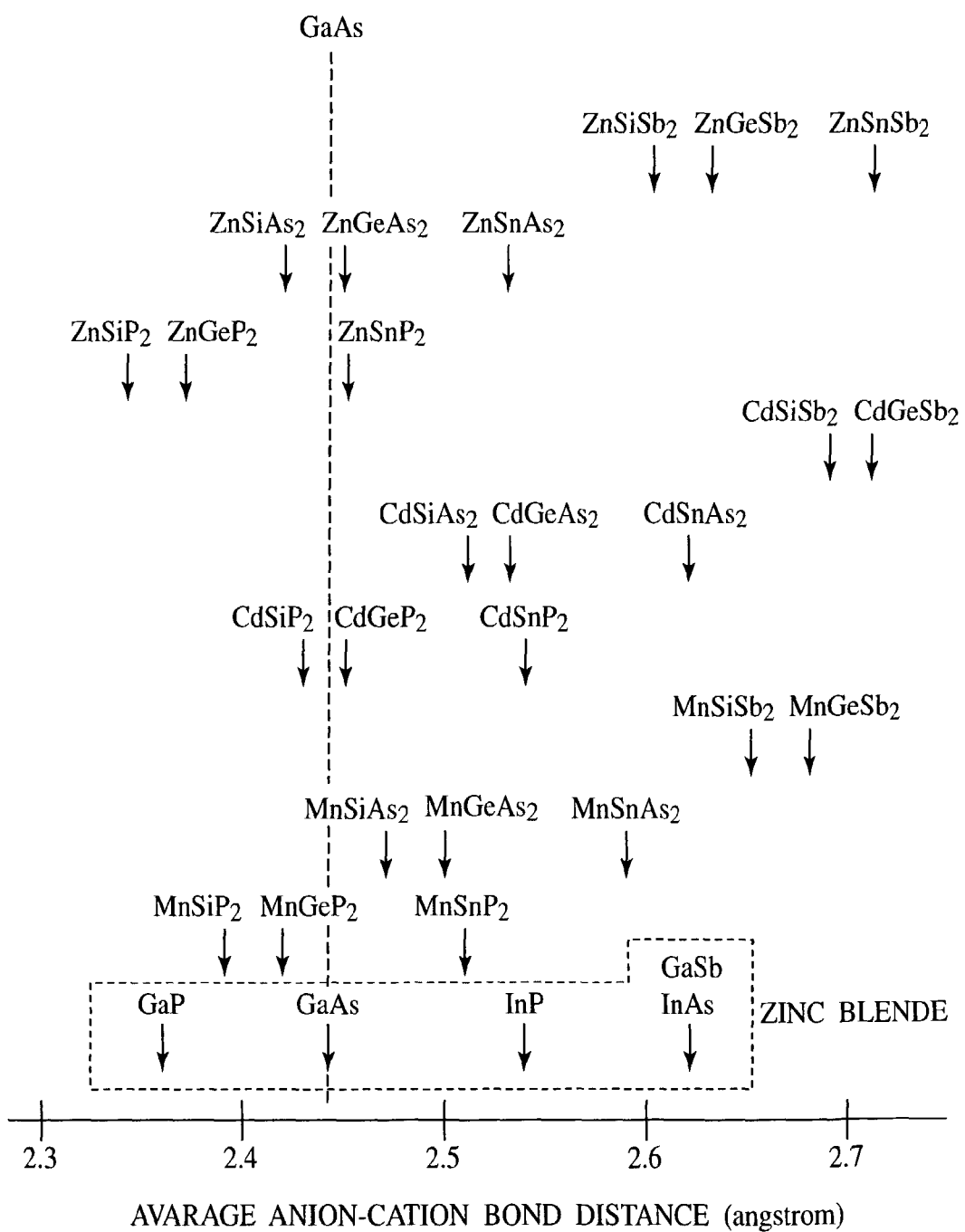
FIG. 3 is a view of average anion-cation bond distances of respective compounds (Part 3).

FIG. 3 is a view of average anion-cation bond distances of the crystals of respective compounds. In FIG. 3, the broken line indicates the anion-cation bond distance of the crystals of GaAs. FIG. 3 is the same as FIGS. 1 and 2 except that the broken line indicates the anion-cation bond distance of the crystal of GaAs.

Chalcopyrite quaternary compounds which contain Mn as a transition metal element and can lattice match with GaAs can be given by using FIG. 3 in the same way as described above.

The chalcopyrite type quaternary compounds prepared by such combination are largely divided in $(T_{0.5}IV_{0.5})_xIII_{1-x}V$ type, $T_{0.5}(IV_xIV'_{1-x})_{0.5}V$ type, $T_{0.5}IV_{0.5}V_xV'_{1-x}$ type and $(II_xT_{1-x})_{0.5}IV_{0.5}V$ type, as described above.

As chalcopyrite type quaternary compounds of $(T_{0.5}IV_{0.5})_x III_{1-x}V$ type are considered $(Mn_{0.5}Si_{0.5})_x In_{1-x}P$, $(Mn_{0.5}Ge_{0.5})_x In_{1-x}P$ and $(Mn_{0.5}Sn_{0.5})_x Ga_{1-x}P$.

A composition ratio X of $(Mn_{0.5}Si_{0.5})_x In_{1-x}P$ for the lattice matching with GaAs is 0.68 in computation. The composition ratio X is suitably adjusted in the range of 0.58 to 0.78, whereby $(Mn_{0.5}Si_{0.5})_x In_{1-x}P$ which substantially lattice matches with GaAs can be prepared.

A composition ratio X of $(Mn_{0.5}Ge_{0.5})_x In_{1-x}P$ for the lattice matching with GaAs is 0.82 in computation. The composition ratio X is suitably adjusted in the range of 0.72 to 0.92, whereby $(Mn_{0.5}Ge_{0.5})_x In_{1-x}P$ which substantially lattice matches with GaAs can be prepared.

A composition ratio X of $(Mn_{0.5}Sn_{0.5})_x Ga_{1-x}P$ for the lattice matching with GaAs is 0.54 in computation. The composition ratio X is suitably adjusted in the range of 0.44 to 0.64, whereby $(Mn_{0.5}Sn_{0.5})_x Ga_{1-x}P$ which substantially lattice matches with GaAs can be prepared.

As chalcopyrite type quaternary compounds of $T_{0.5}(IV_xIV'_{1-x})_{0.5}V$ type are considered $(Mn_{0.5}(Si_xSn_{1-x})_{0.5})P$, and $(Mn_{0.5}(Ge_xSn_{1-x})_{0.5})P$.

A composition ratio X of $(Mn_{0.5}(Si_xSn_{1-x})_{0.5})P$ for the lattice matching with GaAs is 0.59 in computation. The composition ratio X is suitably adjusted in the range of 0.49 to 0.69, whereby $(Mn_{0.5}(Si_xSn_{1-x})_{0.5})P$ which substantially lattice matches with GaAs can be prepared.

A composition ratio X of $(Mn_{0.5}(Ge_xSn_{1-x})_{0.5})P$ for the lattice matching with GaAs is 0.76 in computation. The composition ratio X is suitably adjusted in the range of 0.66 to 0.86, whereby $(Mn_{0.5}(Ge_xSn_{1-x})_{0.5})P$ which substantially lattice matches with GaAs can be prepared.

As chalcopyrite type quaternary compounds of $T_{0.5}IV_{0.5}V_xV'_{1-x}$ type are considered $Mn_{0.5}Si_{0.5}P_xAs_{1-x}$, $Mn_{0.5}Si_{0.5}P_xSb_{1-x}$, $Mn_{0.5}Ge_{0.5}P_xAs_{1-x}$ and $Mn_{0.5}Ge_{0.5}P_xSb_{1-x}$.

A composition ratio X of $Mn_{0.5}Si_{0.5}P_xAs_{1-x}$ for the lattice matching with GaAs is 0.41 in computation. The composition ratio X is suitably adjusted in the range of 0.31 to 0.51, whereby $Mn_{0.5}Si_{0.5}P_xAs_{1-x}$ which substantially lattice matches with GaAs can be prepared.

A composition ratio X of $Mn_{0.5}Si_{0.5}P_xSb_{1-x}$ for the lattice matching with GaAs is 0.82 in computation. The composition ratio X is suitably adjusted in the range of 0.72 to 0.92, whereby $Mn_{0.5}Si_{0.5}P_xSb_{1-x}$ which substantially lattice matches with GaAs can be prepared.

A composition ratio X of $Mn_{0.5}Ge_{0.5}P_xAs_{1-x}$ for the lattice matching with GaAs is 0.73 in computation. The composition ratio X is suitably adjusted in the range of 0.63 to 0.83, whereby $Mn_{0.5}Ge_{0.5}P_xAs_{1-x}$ which substantially lattice matches with GaAs can be prepared.

A composition ratio X of $Mn_{0.5}Ge_{0.5}P_xSb_{1-x}$ for the lattice matching with GaAs is 0.92 in computation. The composition ratio X is suitably adjusted in the range of 0.82 to 1, whereby $Mn_{0.5}Ge_{0.5}P_xSb_{1-x}$ which substantially lattice matches with GaAs can be prepared.

As chalcopyrite type quaternary compounds of $(II_xT_{1-x})_{0.5}IV_{0.5}V$ type are considered $(Zn_xMn_{1-x})_{0.5}Si_{0.5}As$ and $(Cd_xMn_{1-x})_{0.5}Ge_{0.5}P$.

A composition ratio X of $(Zn_xMn_{1-x})_{0.5}Si_{0.5}As$ for the lattice matching with GaAs is 0.62 in computation. The composition ratio X is suitably adjusted in the range of 0.52 to 0.72, whereby $(Zn_xMn_{1-x})_{0.5}Si_{0.5}As$ which substantially lattice matches with GaAs can be prepared.

A composition ratio X of $(Cd_xMn_{1-x})_{0.5}Ge_{0.5}P$ for the lattice matching with GaAs is 0.69 in computation. The composition ratio X is suitably adjusted in the range of 0.59 to 0.79, whereby $(Cd_xMn_{1-x})_{0.5}Ge_{0.5}P$ which substantially lattice matches with GaAs can be prepared.

Magnetic semiconductors composed of the chalcopyrite type quaternary compounds which can lattice match with GaAs have been here described. However, chalcopyrite type compounds which can lattice match with GaAs are not essentially to quaternary compounds but may be five or more elements chalcopyrite type compounds which can be prepared by mixing the above-described chalcopyrite type quaternary compounds by arbitrary ratios. The chalcopyrite type quaternary compounds prepared by the above-described combinations substantially lattice match with GaAs, and the five or more elements chalcopyrite type compounds prepared by combining the chalcopyrite type quaternary compounds prepared by the above-described combinations can lattice match with GaAs.

[A First Embodiment]

Figure 4:
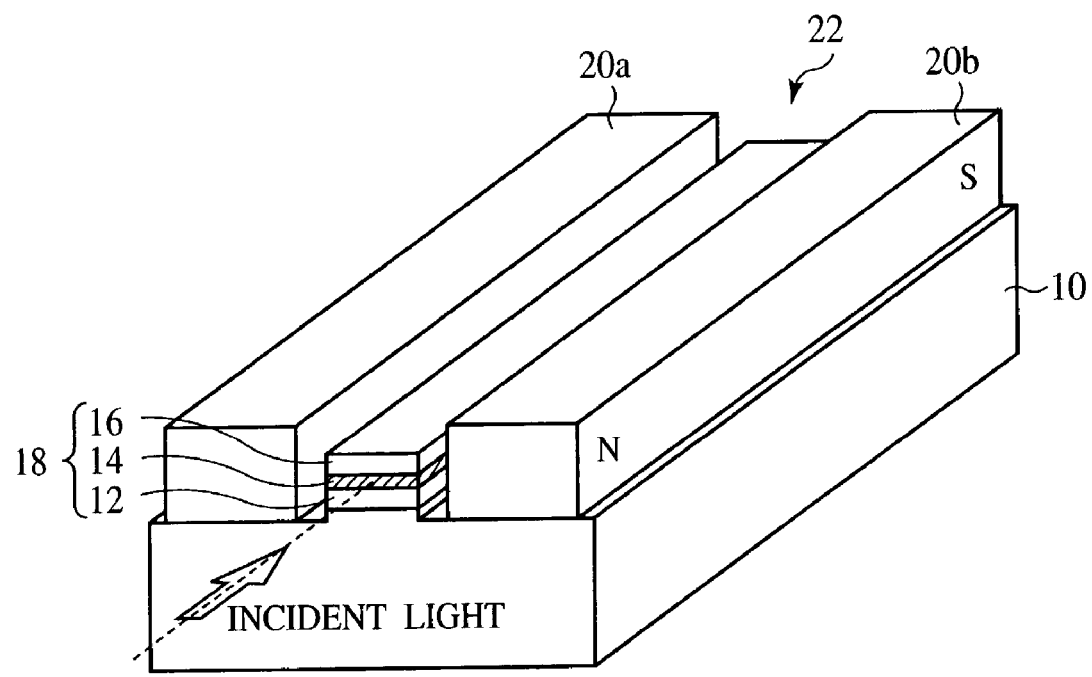
FIG. 4 is a perspective view of the optical circuit device according to a first embodiment of the present invention.

The optical circuit device according to a first embodiment of the present invention and the method for fabricating the same will be explained with reference to FIGS. 4 to 5C. FIG. 4 is a perspective view of the optical circuit device according to the present embodiment. FIGS. 5A to 5C are sectional views of the optical circuit device according to the present embodiment in the steps of the method for fabricating the same, which explain the method.

As shown in FIG. 4, a lower clad layer 12 of, e.g., a 1 μm-InP layer is formed on an InP substraste 10. The thickness of the lower clad layer 12 is not limited to 1 μm and may be suitable set in the range of, e.g., 0.1 to 10 μm.

A core layer 14 of, e.g., a 0.5 μm-($Mn_{0.5}Si_{0.5})_{0.54}In_{0.46}As$ is formed on the lower clad layer 12. As described above, $(Mn_{0.5}Si_{0.5})_{0.54}In_{0.46}As$ contains Mn as the translation metal element and is a magnetic semiconductor of the chalcopyrite type crystal structure which can lattice match with the InP substrate 10.

In the present embodiment, a material of the core layer is exemplified by $(Mn_{0.5}Si_{0.5})_xIn_{1-x}As$. However, the material of the core layer is not limited to $(Mn_{0.5}Si_{0.5})_xIn_{1-x}As$, and the above-described chalcopyrite type compounds which can lattice match with the InP substrate 10 can be suitably used. The thickness of the core layer 14 is not limited to 0.5 μm and may be suitably set in the range of, e.g., 0.01 to 1 μm.

An upper clad layer 16 of, e.g., a 1 μm-InP layer is formed on the core layer 14. The thickness of the lower clad layer 16 is not limited to 1 μm and may be suitably set in the range of 1 to 10 μm.

The lower clad layer 12, the core layer 14 and the upper clad layer 16 form an optical waveguide layer 18. The optical waveguide layer 18 is formed in a mesa. The optical waveguide layer 18 is mesa-shaped for small light loss and good coupling with other optical elements.

A length of the optical waveguide layer 18 is set to be, e.g., 1 mm. However, the length of the optical waveguide layer 18 is not limited to 1 mm and can be suitably set in the range of, e.g., 100 μm to 10 mm.

Permanent magnets 20a, 20b are disposed on the InP substrate 10 on both sides of the mesa-shaped optical waveguide layer 18. The permanent magnets 20a, 20b apply magnetic fields to the optical waveguide layer 18.

The magnetic semiconductor of the chalcopyrite type crystal structure used a material of the core layer 14 can cause Faraday effect as described above. Accordingly, the optical waveguide layer 18 including such magnetic semiconductor as the core layer 14 can form a Faraday rotation element 22 which can rotate a deflection angle by 45 degrees.

The optical circuit device according to the present embodiment has such structure.

Such Faraday rotation element 22 can be combined with a polarizer (not shown), etc. to thereby form an optical isolator. Such Faraday rotation element 22 is combined with a half-wave plate (not shown), a polarization beam slitter (not shown), etc. to thereby form an optical circulator.

As described above, the optical circuit device according to the present embodiment is characterized mainly in that a material of the Faraday rotation element 22 is a magnetic semiconductor of the chalcopyrite type crystal structure which can lattice match with the InP substrate 10.

The magnetic semiconductor of the chalcopyrite type crystal structure which can lattice match with the InP substrate 10 is a material which can cause Faraday effect, and can form the Faraday rotation element 22. Furthermore, the magnetic semiconductor can lattice match with the InP substrate 10 and has the chalcopyrite type crystal structure, and has little crystal defects and accordingly can form a Faraday rotation element of small light loss. The magnetic semiconductor of the chalcopyrite type crystal structure can have a large verde constant, which allows the Faraday rotation element 22 to be shorter, with a result that the optical circuit device can be micronized.

As described above, according to the present embodiment, the Faraday rotation element 22 which is good, can have small light loss and can be micronized can be formed on the InP substrate 10. Furthermore, according to the present embodiment, the optical waveguide layer 18 forming the Faraday rotation element 22 is formed in a mesa, which permits the optical circuit device to have good coupling efficiency.

According to the present embodiment, the Faraday rotation element 22 is formed on the InP substrate 10, which is widely used as substrates of semiconductor lasers, etc., which allows the optical circuit device to have a semiconductor laser, an optical isolator, etc. integrated on one and the same InP substrate 10.

Then, the method for fabricating the optical circuit device according to the present embodiment will be explained with reference to FIGS. 5A to 5C.

Figure 5A:
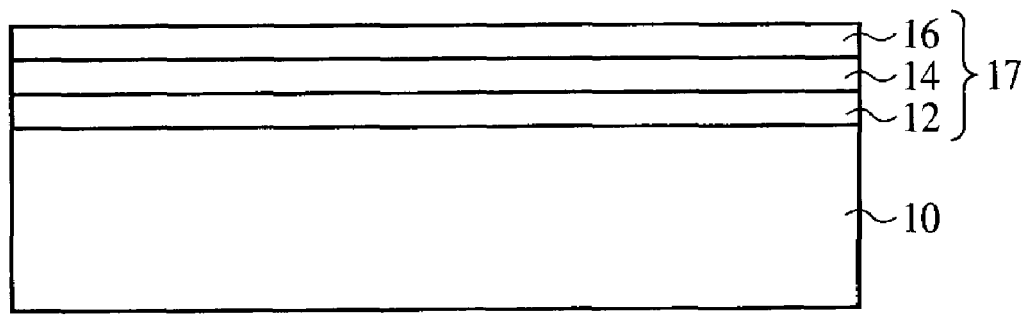
FIGS. 5A to 5C are sectional views of the optical circuit device according to the first embodiment of the present invention in the steps of the method for fabricating the same, which show the method.

As shown in FIG. 5A, the lower clad layer 12 is formed of, e.g., a 1 μm-thickness InP on the entire surface of an InP substrate 10 by MOCVD (Metal Organic Chemical Vapor Deposition). The thickness of the lower clad layer is not limited to 1 μm and can be suitably set in the range of, e.g., 0.1 to 10 μm.

Next, the core layer 14 is formed of e.g., a 0.5 μm-thickness $(Mn_{0.5}Si_{0.5})_{0.54}In_{0.46}As$ on the entire surface by MOCVD. The material of the core layer 14 is not limited to $(Mn_{0.5}Si_{0.5})_{0.54}In_{0.46}As$, and the above-described chalcopyrite type compounds, which can lattice match with the InP substrate 10 can be suitably used. The thickness of the core layer 14 is not limited to 0.5 μm and can be suitably set in the range of, e.g., 0.01 to 1 μm.

Then, the upper clad layer 16 is formed of, e.g., 1 μm-thickness InP film on the entire surface by MOCVD. The thickness of the upper clad layer 16 is not limited to 1 μm and can be suitably set in the range of, e.g., 0.1 to 10 μm.

The lower clad layer 12, the core layer 14 and the upper clad layer 16 form a layer film 17.

Figure 5B:
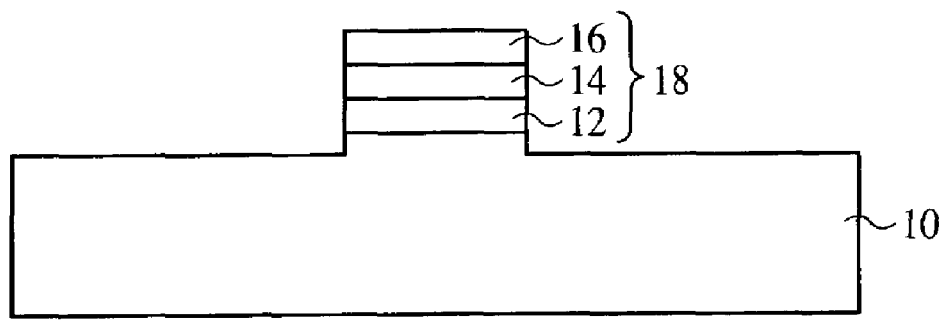

Then, as shown in FIG. 5B, the layer film 17 is patterned in a mesa by dry etching by photolithography. Thus the mesa-shaped optical waveguide layer 18 is formed.

Figure 5C:
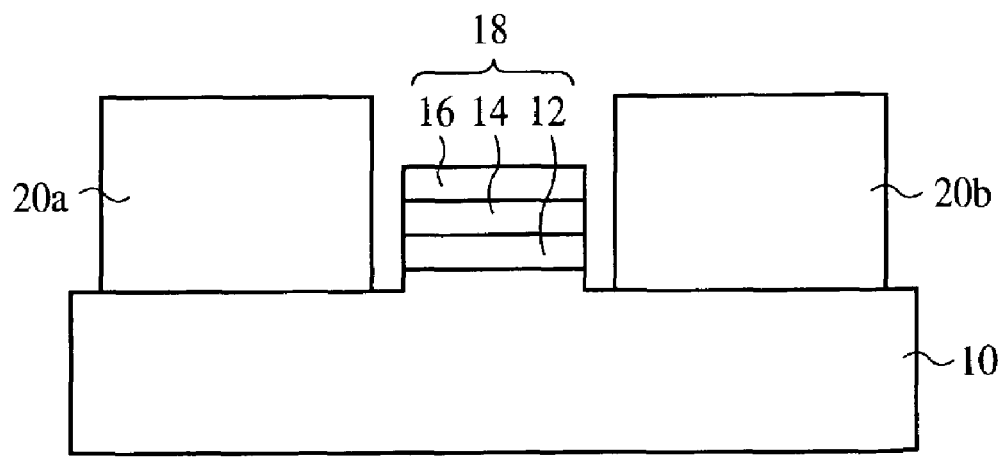

Then, as shown in FIG. 5C, the permanent magnets 20a, 20b are disposed on the InP substrate 10 on both sides of the mesa-shaped optical waveguide 18.

Thus, the optical circuit device according to the present embodiment is fabricated.

(A First Modification)

Figure 6:
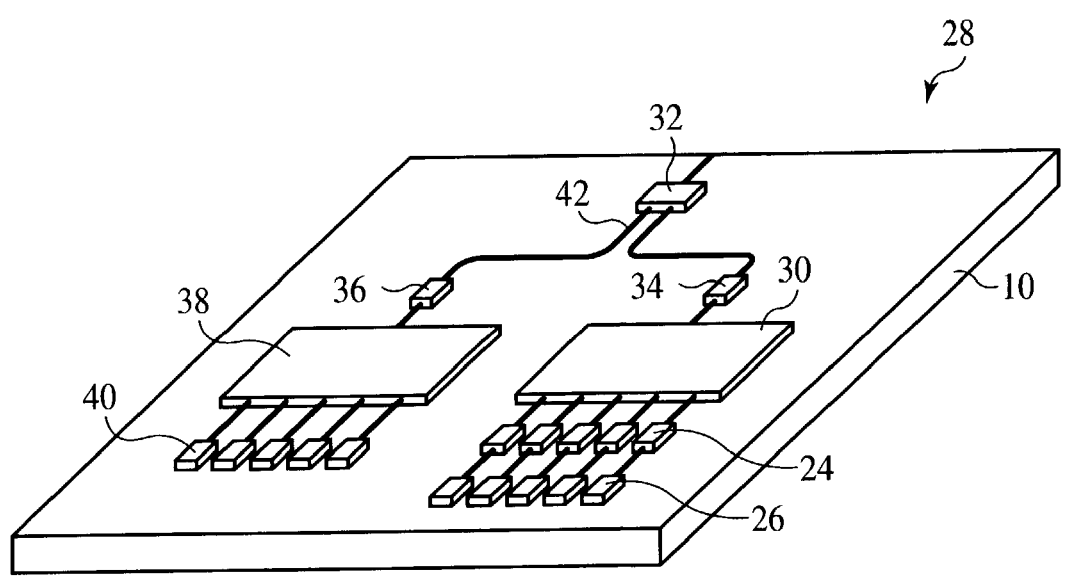
FIG. 6 is a perspective view of the optical circuit device according to a first modification of the first embodiment of the present invention.

Next, the optical circuit device according to a first modification of the present embodiment will be explained with reference to FIG. 6. FIG. 6 is a perspective view of the optical circuit device according to the present modification.

The optical circuit device according to the present modification is characterized mainly in that an optical isolator 24 comprises the Faraday rotation element 22 shown in FIG. 4, and a semiconductor laser 26, etc. are further formed on one and the same InP substrate 10.

Here, the present modification will be explained by means of a multiwavelength optical transceiver 28 including the optical isolator 24, the semiconductor laser 26, etc. integrated on one and the same InP substrate 10. The optical isolator 24 provided by the Faraday rotation element shown in FIG. 4 can be used in the multiwavelength transceiver 28 but also in any other optical circuit device.

As shown in FIG. 6, the semiconductor laser 26, the light isolator 24, light couplers 30, 32, semiconductor light amplifiers 34, 36, an optical branching filter 38, and a photodiode 40 formed on the InP substrate 10. These optical elements are optically connected by the optical waveguide 42.

The optical isolator 24 includes polarizers (not shown) combined on both ends of the Faraday rotation element 22 shown in FIG. 4. The optical isolator 24 is disposed on the output side of the semiconductor laser 26 to thereby prohibit the reflected light from returning to the semiconductor laser 26.

The optical circuit device according to the present modification is thus constituted.

According to the present modification, the optical circuit device including the optical isolator 24, the semiconductor laser 26, etc. integrated on one and the same InP substrate 10 can be provided.

(A Second Modification)

Figure 7:
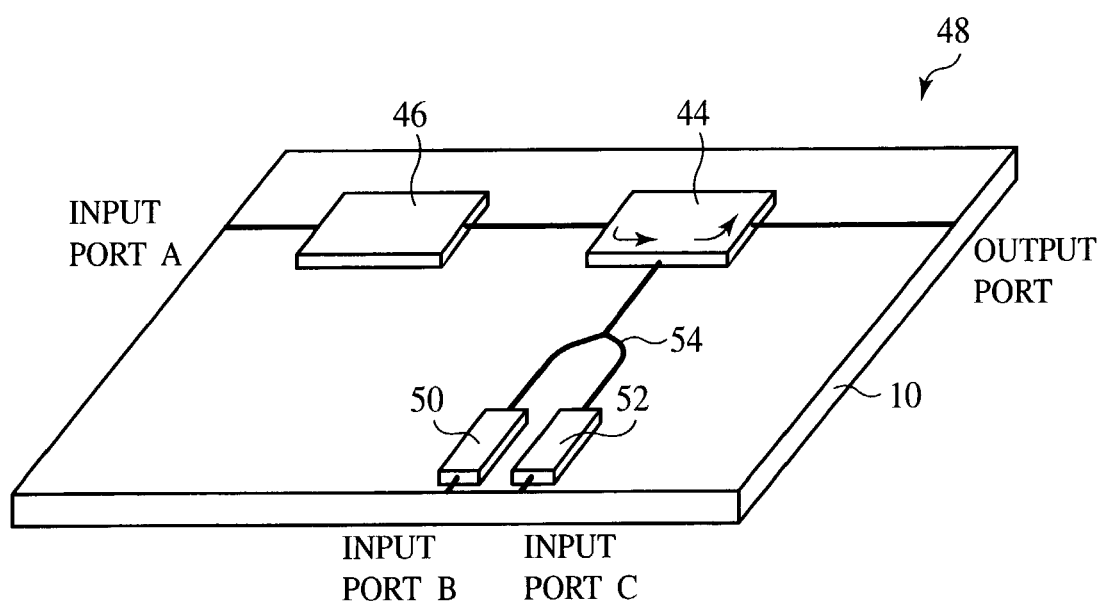
FIG. 7 is a perspective view of the optical circuit device according to a second modification of the first embodiment of the present invention.

Then, the optical circuit device according to a second embodiment of the present invention will be explained with reference to FIG. 7. FIG. 7 is a perspective view of the optical circuit device according to the present modification.

The optical circuit device according to the present modification is characterized mainly in that an optical circulator 44 comprises the Faraday rotation element 22 shown in FIG. 4, and a semiconductor laser 46, etc. are further formed on one and the same InP substrate 10.

The present modification is exemplified by a photosignal regenerator 48 including the optical circulator 44, the semiconductor laser 44, etc. integrated on one and the same InP substrate 10. The optical circulator 44 comprising the Faraday rotation element 22 shown in FIG. 4 can be used not only in the photosignal regenerator 48 but also in any other optical circuit device.

As shown in FIG. 7, semiconductor light amplifiers 50, 52, the semiconductor laser 46, and the optical circulator 44 are formed on the InP substrate 10. These optical elements are optically connected by an optical waveguide 54.

The optical circulator 44 includes a half-wave plate (not shown), a polarization beam splitter (not shown), etc. combined with the Faraday rotation element 22 shown in FIG. 4.

The semiconductor laser 46 comprises a mode-locked laser.

The optical circuit device according to the present modification has such structure.

Next, the operation of the optical circuit device according to the present modification will be explained.

A photosignal whose waveform and timing have been deformed and disordered in transmission is divided in three photosignals. Suitable phase shifts are set for these photosignals to introduce the respective photosignals into input ports A, B, C. Then, the photosingal having the waveform and the timing adjusted, i.e., the regenerated photosingal is outputted from an output port.

As described above, according to the present modification, the optical circuit device can include the semiconductor laser 46 and the optical circulator 44 integrated on one and the same InP substrate 10.

[A Second Embodiment]

Figure 8:
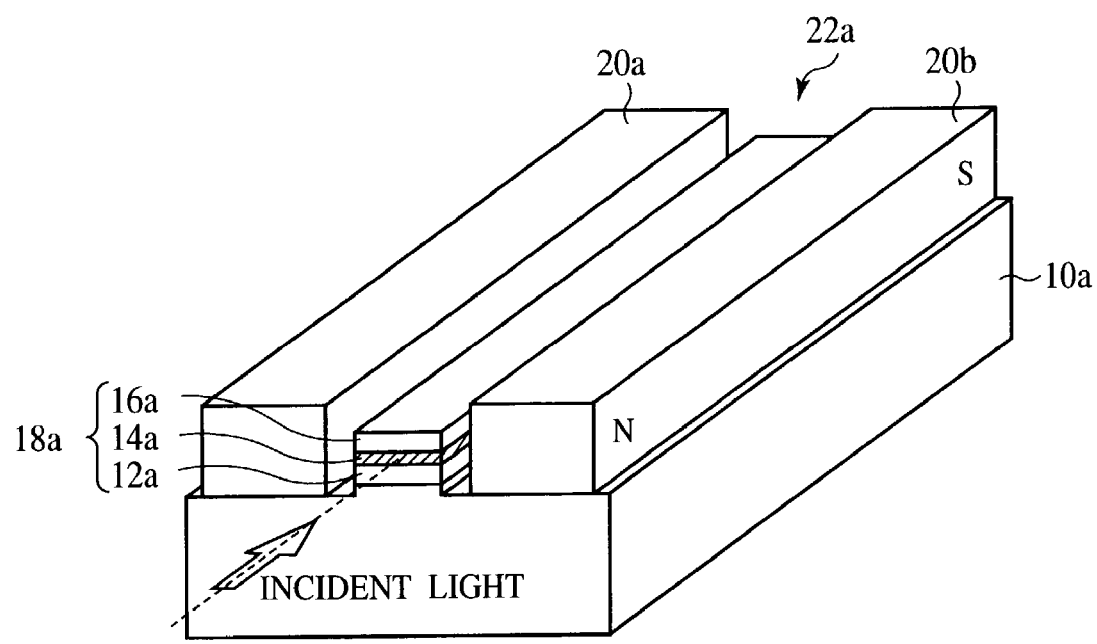
FIG. 8 is a perspective view of the optical circuit device according to a second embodiment of the present invention.

The optical circuit device according to a second embodiment of the present invention will be explained with reference to FIG. 8. FIG. 8 is a perspective view of the optical circuit device according to the present embodiment. The same members of the present embodiment as those of the optical circuit device according to the first embodiment and the method for fabricating the same are represented by the same reference numbers not to repeat or to simplify their explanation.

The optical circuit device according to the present embodiment is characterized mainly in that an $In_{0.3}Ga_{0.7}As$ substrate 10a is used.

As shown in FIG. 8, a lower clad layer 12a of, e.g., a 1 $\mu$m-thickness $In_{0.77}Ga_{0.23}P$ is formed on the monocrystal $In_{0.3}Ga_{0.7}As$ substrate 10a.

A core layer 14a of, e.g., 0.5 $\mu$m-thickness $(Mn_{0.5}Si_{0.5})_{0.86}In_{0.14}As$ is formed on the lower clad layer 12. The material of the core layer 14a is not limited to $(Mn_{0.5}Si_{0.5})_{0.86}In_{0.14}As$, and the above-described chalcopyrite type compounds which can substantially lattice match with the $In_{0.3}Ga_{0.7}As$ substrate 10a can be suitably used.

An upper clad layer 16a of, e.g., a 1 $\mu$m-thickness $In_{0.77}Ga_{0.23}P$ is formed on the core layer 14a.

The lower clad layer 12a, the core layer 14a and the upper clad layer 16a form an optical waveguide layer 18a. The optical waveguide layer 18a is formed in a mesa.

As described above, according to the present embodiment, the Faraday rotation element 22a which is good, can have small light loss and can be micronized can be formed on the InGaAs substrate 10a. Furthermore, according to the present embodiment, the waveguide layer 18a forming the Faraday rotation element 22a is formed in a mesa, which permits the optical circuit device to have good coupling efficiency.

According to the present embodiment, the Faraday rotation element 22a is formed on the InGaAs substrate 10a, which is widely used as substrates of semiconductor lasers, etc., which allows the optical circuit device to have a semiconductor laser, an optical isolator, etc. integrated on one and the same InGaAs substrate 10a.

The optical circuit device according to the present embodiment can be fabricated in substantially the same way as by the method for fabricating the optical circuit device according to the first embodiment shown in FIG. 5.

[A Third Embodiment]

Figure 9:
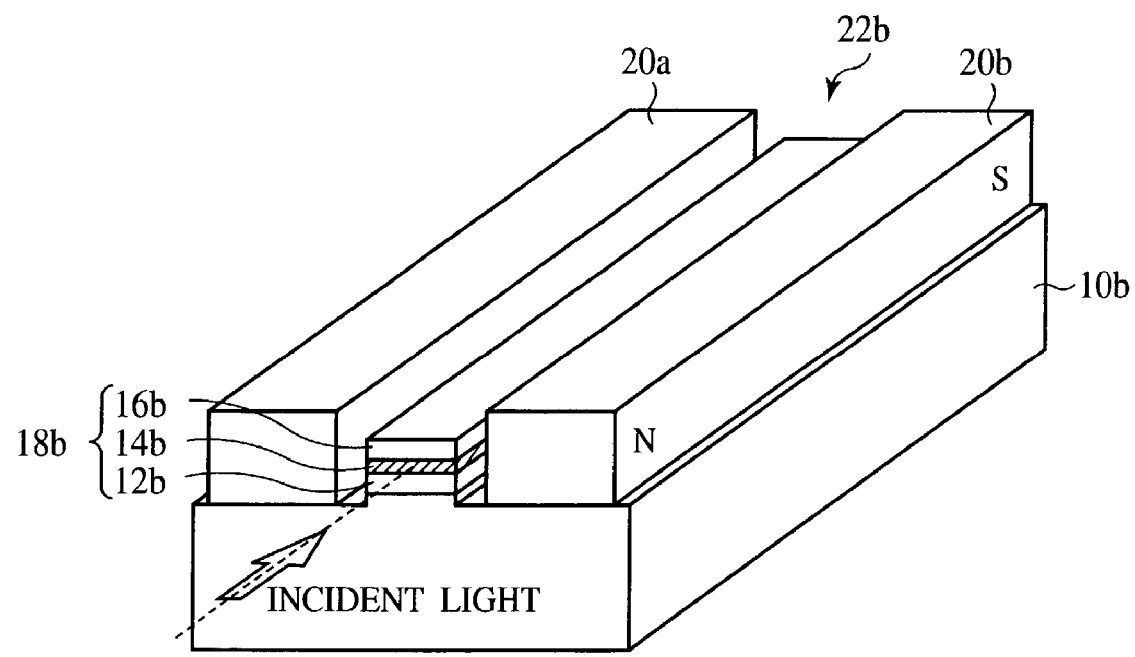
FIG. 9 is a perspective view of the optical circuit device according to a third embodiment of the present invention.
Figure 10:
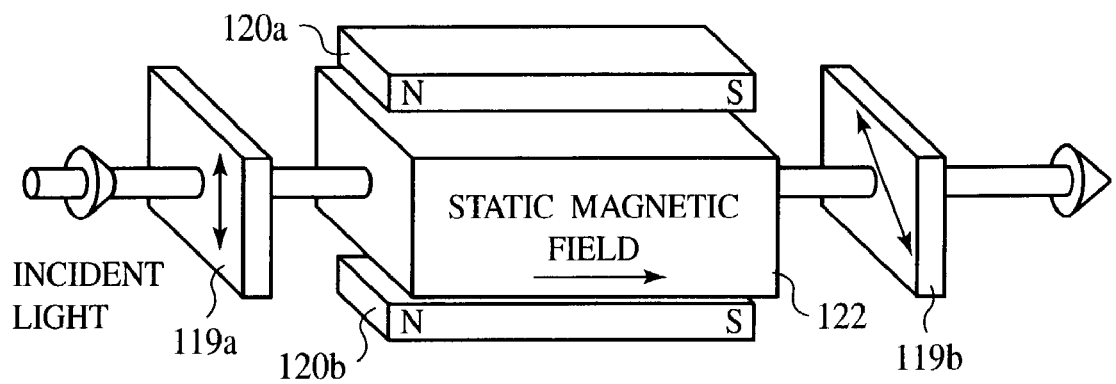
FIG. 10 is a conceptual view of the conventional optical isolator.
Figure 11A:
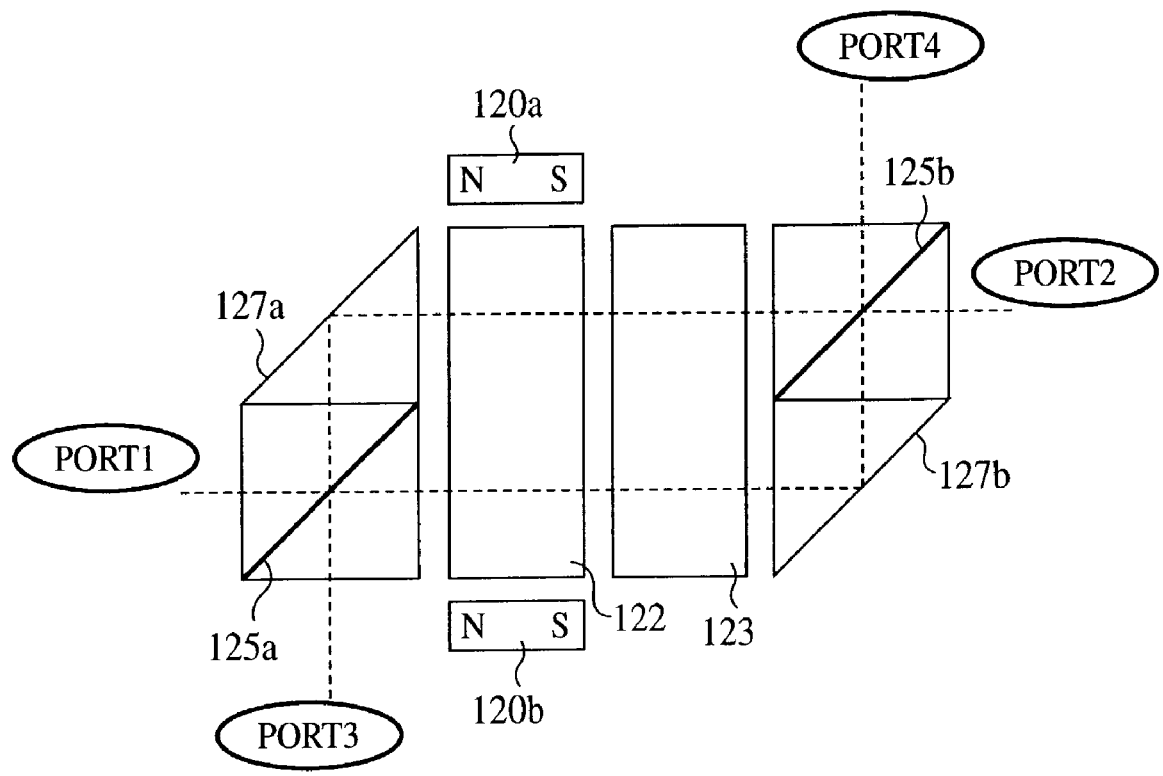
FIGS. 11A and 11B are conceptual views of the conventional optical circulator.
Figure 11B:
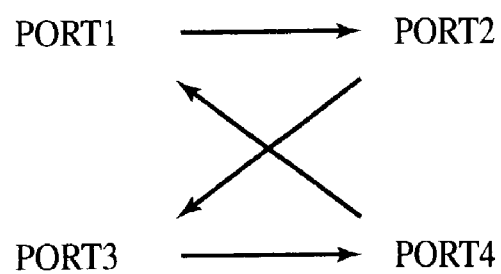

The optical circuit device according to a third embodiment of the present invention will be explained with reference to FIG. 9. FIG. 9 is a perspective view of the optical circuit device according to the present embodiment. The same members of the present embodiment as those of the optical circuit device according to the first and the second embodiment shown in FIGS. 4 to 8 are represented by the same reference numbers not to repeat or to simplify their explanation.

The optical circuit device according to the present embodiment is characterized mainly in that a GaAs substrate 10b is used.

As shown in FIG. 9, a lower clad layer 12b of, e.g., a 1 $\mu$m-thickness $In_{0.47}Ga_{0.53}P$ film is formed on a monocrystal GaAs substrate 10b.

A core layer 14b of, e.g., a 0.5 $\mu$m-thickness $(Mn_{0.5}Sn_{0.5})_{0.54}Ga_{0.46}P$ film is formed on the lower clad layer 12b. The material of the core layer 14b is not limited to $(Mn_{0.5}Sn_{0.5})_{0.54} Ga_{0.46}P$, and the above-described chalcopyrite type compounds which can substantially lattice match with the GaAs substrate 10b can be suitably used.

An upper clad layer 16b of, e.g., a 1 $\mu$m-thickness $In_{0.47}Ga_{0.53}P$ is formed on the core layer 14b.

The lower clad layer 12b, the core layer 14b and the upper clad layer 16b form an optical waveguide layer 18b. The optical waveguide layer 18b is formed in a mesa.

As described above, according to the present embodiment, the Faraday rotation element 22b which is good, can have small light loss and can be micronized can be formed on the GaAs substrate 10b. Furthermore, according to the present embodiment, the waveguide layer 18b forming the Faraday rotation element 22b is formed in a mesa, which permits the optical circuit device to have good coupling efficiency.

According to the present embodiment, the Faraday rotation element 22b is formed on the GaAs substrate 10b, which is widely used as substrates of semiconductor lasers, etc., which allows the optical circuit device to have a semiconductor laser, an optical isolator, etc. integrated on one and the same GaAs substrate 10b.

The optical circuit device according to the present embodiment can be fabricated in substantially the same way as by the method for fabricating the optical circuit device according to the first embodiment.

[Modifications of the Embodiments]

The present invention is not limited to the above-described embodiments and can cover other various modifications.

For example, in each of the above-described embodiments, the permanent magnets are disposed on the semiconductor substrate on both sides of the optical waveguide. However, the permanent magnets are not essential, because the core layer of the optical waveguide layer is formed of the magnetic semiconductor, and the core layer can be magnetized by applying a magnetic field in advance, whereby Faraday effect can be caused.

In the above-described embodiments, the transition metal element is exemplified by Mn. However, the transition metal element is not limited to Mn and can be another transition metal element, such as Cr, Fe, Co, Ni or others.

It is possible that an optical isolator and an optical circulator comprise the Faraday rotation elements 22a, 22b of the second and the third embodiment, and optical elements, such as semiconductor lasers, etc., are formed on one and the same substrates. Thus, optical circuit devices including the optical isolator, etc. and the semiconductor lasers, etc. integrated on one and the same InGaAs substrate and the GaAs substrate can be provided.

What is claimed is:

1. An optical circuit device comprising:
   a substrate of a III–V group compound semiconductor; and
   a magnetic semiconductor layer formed on the substrate, substantially lattice matching with the substrate and having the chalcopyrite type crystal structure,
   wherein the magnetic semiconductor layer is formed of a compound of $(T_{0.5}IV_{0.5})_x III_{1-x} V$ type, a compound of $T_{0.5}(IV_x IV'_{1-x})_{0.5} V$ type, a compound of $T_{0.5}IV_{0.5} V_x V'_{1-x}$ type, a compound of $(II_x T_{1-x})_{0.5} IV_{0.5} V$ type or a mixed compound of said compounds, in which T represents a transition metal element; II indicates a II group element; III denotes a III group element; IV and IV' represent a IV group element; and V and V' indicate a V group element.

2. An optical circuit device according to claim 1, wherein the transition metal element is Mn.

3. An optical circuit device according to claim 2, wherein the substrate is an InP substrate;
   the compound of $(T_{0.5}IV_{0.5})_x III_{1-x} V$ type is $(Mn_{0.5}Si_{0.5})_x In_{1-x} As$ of a composition ratio X of 0.44 to 0.64, $(Mn_{0.5}Ge_{0.5})_x In_{1-x} As$ of a composition ratio X of 0.56 to 0.76 or $(Mn_{0.5}Sn_{0.5})_x Ga_{1-x} As$ of a composition ratio X of 0.57 to 0.77;
   the compound of $T_{0.5}(IV_x IV'_{1-x})_{0.5} V$ type is $(Mn_{0.5}(Si_x Sn_{1-x})_{0.5})As$ of a composition ratio of 0.32 to 0.52 or $(Mn_{0.5}(Ge_x Sn_{1-x})_{0.5})As$ of a composition ratio X of 0.44 to 0.64;
   the compound of $T_{0.5}IV_{0.5} V_x V'_{1-x}$ type is $Mn_{0.5}Si_{0.5}P_x Sb_{1-x}$ of a composition ratio X of 0.34 to 0.54, $Mn_{0.5}Si_{0.5}As_x Sb_{1-x}$ of a composition ratio X of 0.53 to 0.73, $Mn_{0.5}Ge_{0.5}P_x Sb_{1-x}$ of a composition ratio X of 0.43 to 0.63, $Mn_{0.5}Ge_{0.5}As_x Sb_{1-x}$ of a composition ratio X of 0.67 to 0.87, $Mn_{0.5}Sn_{0.5}P_x As_{1-x}$ of a composition ratio X of 0.50 to 0.70 or $Mn_{0.5}Sn_{0.5}P_x Sb_{1-x}$ of a composition ratio X of 0.78 to 0.98; and
   the compound of $(II_x T_{1-x})_{0.5} IV_{0.5} V$ type is $(Zn_x Mn_{1-x})_{0.5} Sn_{0.5} As$ of a composition ratio X of 0.81 to 1.

4. An optical circuit device according to claim 2, wherein the substrate is an $In_x Ga_{1-x} As$ substrate of a composition ratio X of 0.2 to 0.4;
   the compound of $(T_{0.5}IV_{0.5})_x III_{1-x} V$ type is $(Mn_{0.5}Si_{0.5})_x In_{1-x} P$ of a composition ratio X of 0.21 to 0.41, $(Mn_{0.5}Ge_{0.5})_x In_{1-x} P$ of a composition ratio X of 0.28 to 0.48; the composition of $(Mn_{0.5}Sn_{0.5})_x Ga_{1-x} P$ of a composition ratio X of 0.80 to 1, $(Mn_{0.5}Si_{0.5})_x In_{1-x} As$ of a composition ratio X of 0.76 to 0.96, $(Mn_{0.5}Ge_{0.5})_x Ga_{1-x} As$ of a composition ratio X of 0.82 to 1, or $(Mn_{0.5}Sn_{0.5})_x Ga_{1-x} As$ of a composition ratio X of 0.26 to 0.46;
   the compound of $T_{0.5}(IV_x IV'_{1-x})_{0.5} V$ type is $(Mn_{0.5}(Si_x Sn_{1-x})_{0.5})P$ of a composition ratio X of 0.02 to 0.22, $(Mn_{0.5}(Ge_x Sn_{1-x})_{0.5})P$ of a composition ratio X of 0.06 to 0.26, $(Mn_{0.5}(Si_x Ge_{1-x})_{0.5})As$ of a composition ratio X of 0.07 to 0.27 or $(Mn_{0.5}(Si_x Sn_{1-x})_{0.5})As$ of a composition ratio X of 0.72 to 0.92;
   the compound of $T_{0.5}IV_{0.5} V_x V'_{1-x}$ type is $Mn_{0.5}Si_{0.5}P_x Sb_{1-x}$ of a composition ratio X of 0.51 to 0.71, $Mn_{0.5}Si_{0.5}As_x Sb_{1-x}$ of a composition ratio X of 0.78 to 0.98, $Mn_{0.5}Ge_{0.5}P_x As_{1-x}$ of a composition ratio X of 0 to 0.15 or $Mn_{0.5}Ge_{0.5}P_x Sb_{1-x}$ of a composition ratio X of 0.61 to 0.81; and
   the compound of $(II_x T_{1-x})_{0.5} IV_{0.5} V$ type is $(Zn_x Mn_{1-x})_{0.5} Sn_{0.5} P$ of a composition ratio X of 0.17 to 0.37, $(Zn_x Mn_{1-x})_{0.5} Ge_{0.5} As$ of a composition ratio X of 0 to 0.18, or $(Cd_x Mn_{1-x})_{0.5} Si_{0.5} As$ of a composition ratio of 0.55 to 0.75.

5. An optical circuit device according to claim 2, wherein the substrate is a GaAs substrate;
   the compound of $(T_{0.5}IV_{0.5})_x III_{1-x} V$ type is $(Mn_{0.5}Si_{0.5})_x In_{1-x} P$ of a composition ratio X of 0.58 to 0.78, $(Mn_{0.5}Ge_{0.5})_x In_{1-x} P$ of a composition ratio X of 0.72 to 0.92 or $(Mn_{0.5}Sn_{0.5})_x Ga_{1-x} P$ of a composition ratio X of 0.44 to 0.64;
   the compound of $T_{0.5}(IV_x IV'_{1-x})_{0.5} V$ type is $(Mn_{0.5}(Si_x Sn_{1-x})_{0.5})P$ of a composition ratio X of 0.49 to 0.69 or $(Mn_{0.5}(Ge_x Sn_{1-x})_{0.5})P$ of a composition ratio X of 0.66 to 0.86;
   the compound of $T_{0.5}IV_{0.5} V_x V'_{1-x}$ type is $Mn_{0.5}Si_{0.5}P_x As_{1-x}$ of a composition ratio X of 0.31 to 0.51, $Mn_{0.5}Si_{0.5}P_x Sb_{1-x}$ of a composition ratio X of 0.72 to 0.92, $Mn_{0.5}Ge_{0.5}P_x As_{1-x}$ of a composition ratio X of 0.63 to 0.83 or $Mn_{0.5}Ge_{0.5}P_x Sb_{1-x}$ of a composition ratio X of 0.82 to 1; and
   the compound of $(II_x T_{1-x})_{0.5} IV_{0.5} V$ type is $(Zn_x Mn_{1-x})_{0.5} Si_{0.5} As$ of a composition ratio X of 0.52 to 0.72 or $(Cd_x Mn_{1-x})_{0.5} Ge_{0.5} P$ of a composition ratio X of 0.59 to 0.79.

6. An optical circuit device according to claim 1, comprising:
   an optical waveguide layer including a core layer of the magnetic semiconductor layer and clad layers formed respectively formed on and below the core layer.

7. An optical circuit device according to claim 2, comprising;
   an optical waveguide layer including a core layer of the magnetic semiconductor layer and clad layers formed respectively formed on and below the core layer.

8. An optical circuit device comprising:

a substrate of a III–V group compound semiconductor;

a magnetic semiconductor layer formed on the substrate, substantially lattice matching with the substrate and having the chalcopyrite type crystal structure;

an optical waveguide layer including a core layer of the magnetic semiconductor layer and clad layers formed respectively formed on and below the core layer, wherein the optical waveguide layer is formed in a mesa.

9. An optical circuit device according to claim 6, wherein the optical waveguide layer is formed in a mesa.

10. An optical circuit device according to claim 7, wherein the optical waveguide layer is formed in a mesa.

11. An optical circuit device according to claim 8, further comprising permanent magnets disposed on the substrate on both sides of the optical waveguide layer.

12. An optical circuit device according to claim 9, further comprising permanent magnets disposed on the substrate on both sides of the optical waveguide layer.

13. An optical circuit device according to claim 10, further comprising permanent magnets disposed on the substrate on both sides of the optical waveguide layer.

14. An optical circuit device according to claim 8, further comprising a light emitting element formed on the substrate and optically coupled with the optical waveguide layer.

15. An optical circuit device according to claim 9, further comprising a light emitting element formed on the substrate and optically coupled with the optical waveguide layer.

16. An optical circuit device according to claim 10, further comprising:

a light emitting element formed on the substrate and optically coupled with the optical waveguide layer.

17. A method for fabricating an optical circuit device comprising the step of forming on the substrate of a III–V group compound semiconductor a magnetic semiconductor layer which substantially lattice matches with the substrate and has a chalcopyrite type crystal structure, wherein the magnetic semiconductor layer is formed of a compound of $(T_{0.5}IV_{0.5})_x III_{1-x}V$ type, a compound of $T_{0.5}(IV_x IV'_{1-x})_{0.5}V$ type, a compound of $T_{0.5}IV_{0.5}V_x V'_{1-x}$ type, a compound of $(II_x T_{1-x})_{0.5}IV_{0.5}V$ type or a mixed compound of said compounds, in which T represents a transition metal element; II indicates a II group element; III denotes a III group element; IV and IV' represent a IV group element; and V and V' indicate a V group element.

* * * * *